(12) United States Patent
Wunsch

(10) Patent No.: US 9,199,292 B2
(45) Date of Patent: Dec. 1, 2015

(54) METHOD FOR PRODUCING STEEL PROFILES

(75) Inventor: Achim Wunsch, Munich (DE)

(73) Assignee: ORIGAMI STEEL CORP., Austin, TX (US)

( * ) Notice: Subject to any disclaimer, the term of this patent is extended or adjusted under 35 U.S.C. 154(b) by 0 days.

(21) Appl. No.: 14/115,589

(22) PCT Filed: May 4, 2012

(86) PCT No.: PCT/EP2012/058311
§ 371 (c)(1),
(2), (4) Date: Feb. 13, 2014

(87) PCT Pub. No.: WO2012/150352
PCT Pub. Date: Nov. 8, 2012

(65) Prior Publication Data
US 2014/0186650 A1 Jul. 3, 2014

(30) Foreign Application Priority Data
May 5, 2011 (DE) .................. 10 2011 100 633

(51) Int. Cl.
*B21D 43/28* (2006.01)
*B21D 5/00* (2006.01)
(Continued)

(52) U.S. Cl.
CPC *B21D 5/00* (2013.01); *B21D 11/10* (2013.01); *B21D 11/20* (2013.01); *B21D 17/04* (2013.01); *B21D 39/02* (2013.01); *B21D 47/00* (2013.01); *B23K 26/1429* (2013.01); *B23K 26/3206* (2013.01); *B23K 26/34* (2013.01);
(Continued)

(58) Field of Classification Search
CPC .......... B21D 5/00; B21D 11/10; B21D 11/20; B21D 17/04; B21D 47/00; B21D 39/02; B23K 2201/16; B23K 2203/04; B23K 26/1429; B23K 26/3206; B23K 26/34; Y10T 428/1241
See application file for complete search history.

(56) References Cited

U.S. PATENT DOCUMENTS 3,287,041 A 11/1966 Cohen
3,877,275 A * 4/1975 Attwood .................. 72/234
(Continued)

FOREIGN PATENT DOCUMENTS

CN 20138274 Y 9/2009
DE 2131726 C3 6/1978
(Continued)

OTHER PUBLICATIONS

International Search Report and Written Opinion for International Application No. PCT/EP2012/058311 mailed Mar. 27, 2013. (22 pages).
(Continued)

*Primary Examiner* — David B Jones
(74) *Attorney, Agent, or Firm* — Merchant & Gould P.C.

(57) ABSTRACT

The invention relates to the field of steel processing and steel production, in particular the production of steel profiles. The invention relates to a method for manufacturing a steel profile, the method comprising the steps of: providing a workpiece (2, 44, 52), in particular a steel blank, preferably a steel strip blank, forming a weakened point (10) in the region of a planned bend in the workpiece (2, 44, 52) and bending the workpiece (2, 44, 52) to produce a bend in the workpiece (2, 44, 52). After bending, the weakened point (10) is reinforced by welding.

10 Claims, 11 Drawing Sheets

(51) Int. Cl.
*B21D 11/10* (2006.01)
*B21D 11/20* (2006.01)
*B21D 17/04* (2006.01)
*B21D 47/00* (2006.01)
*B21D 39/02* (2006.01)
*B23K 26/14* (2014.01)
*B23K 26/32* (2014.01)
*B23K 26/34* (2014.01)

(52) U.S. Cl.
CPC ........ *B23K 2201/16* (2013.01); *B23K 2203/04* (2013.01); *Y10T 428/1241* (2015.01)

(56) References Cited

U.S. PATENT DOCUMENTS

| | | | |
|---|---|---|---|
| 4,024,691 A | | 5/1977 | Hansen et al. |
| 4,223,503 A | | 9/1980 | Hague |
| 5,867,949 A | | 2/1999 | Untiedt |
| 5,904,343 A | | 5/1999 | Parth |
| 6,412,325 B1 | * | 7/2002 | Croswell .......................... 72/324 |
| 6,640,605 B2 | * | 11/2003 | Gitlin et al. .................. 72/379.2 |
| 7,574,839 B1 | | 8/2009 | Simpson |
| 7,955,101 B2 | * | 6/2011 | Lawson et al. ................. 439/177 |
| 8,146,229 B2 | * | 4/2012 | Henriott et al. ................. 72/339 |

FOREIGN PATENT DOCUMENTS

| | | | |
|---|---|---|---|
| DE | 3435352 A1 | 5/1985 | |
| DE | 4442476 C2 | 1/1999 | |
| GB | 403276 A | 4/1933 | |
| GB | 2 306 526 | 5/1997 | |
| GB | 2 397 074 | 7/2004 | |
| JP | 7 100528 | 4/1995 | |
| JP | 9 057352 | 3/1997 | |
| JP | 10 015619 | 1/1998 | |
| JP | 10-015619 | * 1/1998 | ............... B21D 5/08 |
| JP | 2008 137105 | 6/2008 | |
| RU | 2167239 C2 | 5/2001 | |
| WO | WO 99/42669 A1 | 8/1999 | |
| WO | WO 03/018927 | 3/2003 | |
| WO | WO 2006/125248 | 11/2006 | |
| WO | WO 2009/118498 | 10/2009 | |

OTHER PUBLICATIONS

Examination Report from the Eurasian Patent Organization for corresponding Eurasian Patent Application No. 201391631/31 (issued Apr. 21, 2015).

Examination Report from the German Patent Office for corresponding German Patent Application No. 10 2011 100 633.1 (issued Apr. 15, 2013).

* cited by examiner

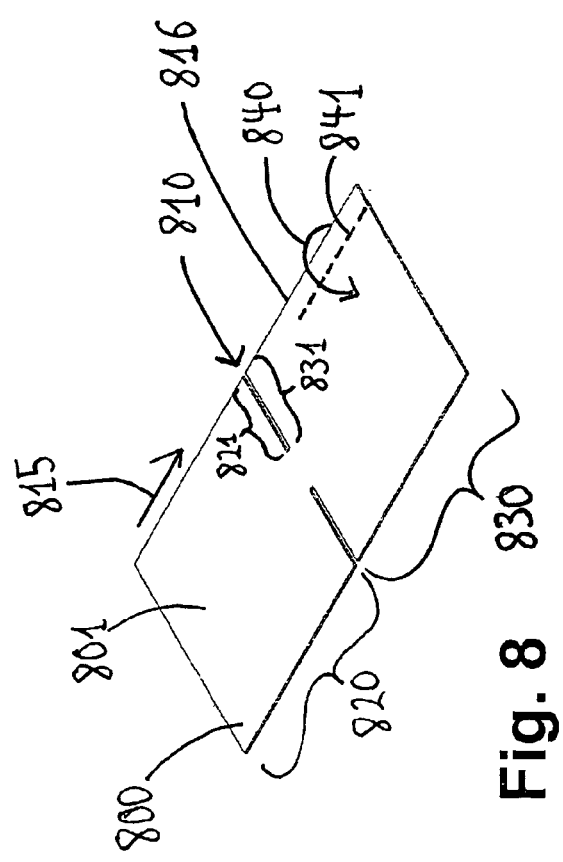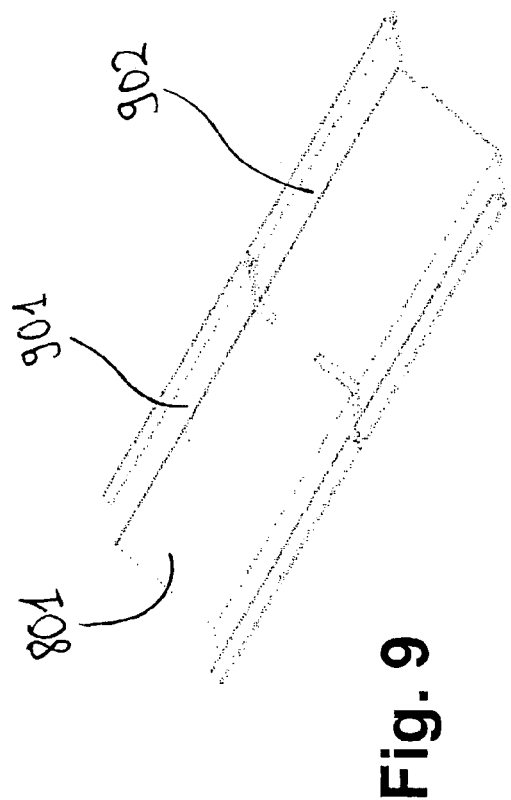
Fig. 8
Fig. 9

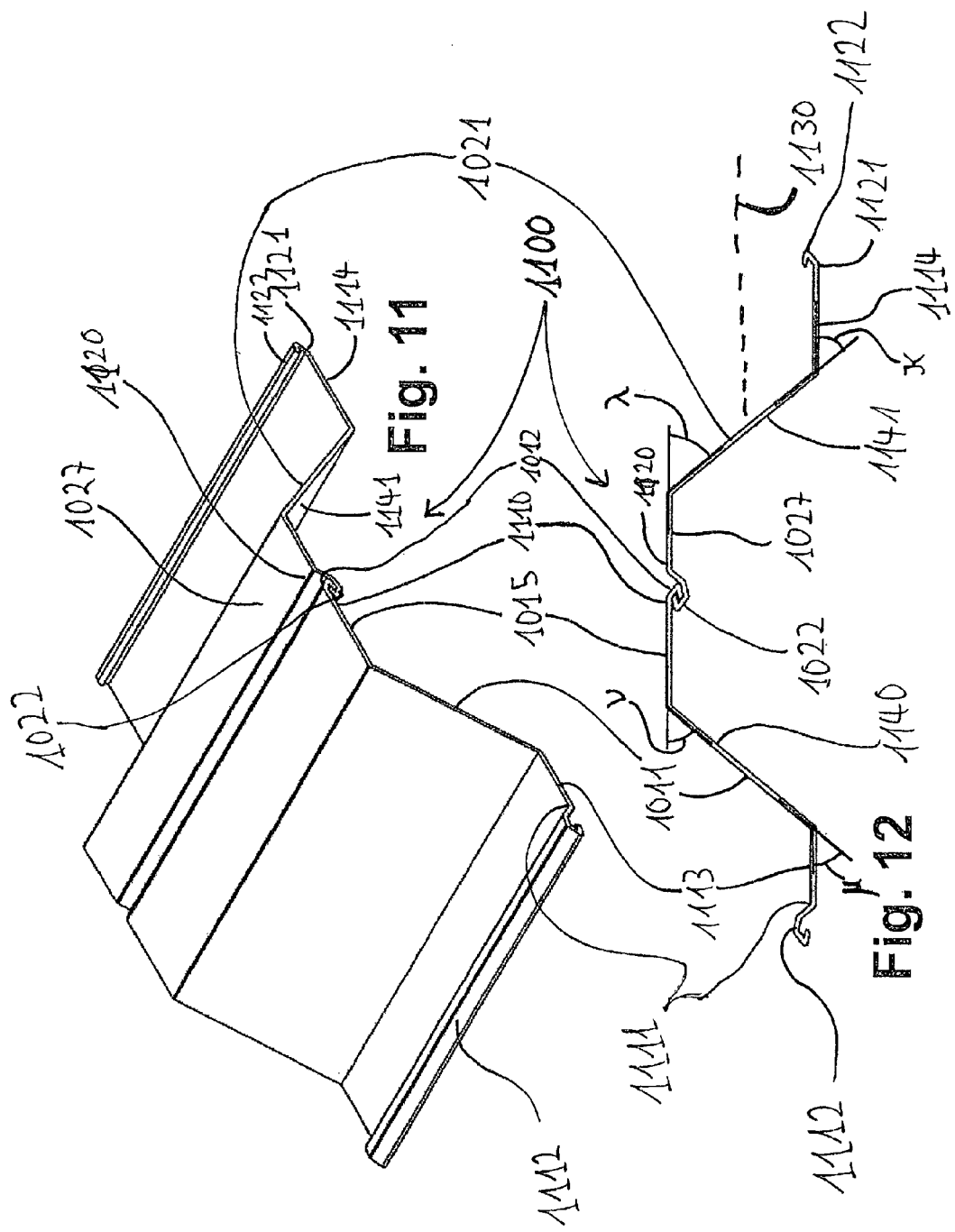

METHOD FOR PRODUCING STEEL PROFILES

This application is a National Stage Application of PCT/EP2012/058311, filed 4 May 2012, which claims benefit of Serial No. 10 2011 100 633.1, filed 5 May 2011 in Germany and which applications are incorporated herein by reference. To the extent appropriate, a claim of priority is made to each of the above disclosed applications.

BACKGROUND

The invention relates to the field of steel processing and steel production, in particular the production of steel profiles. The invention relates to a method for producing steel profiles. The invention further relates to a steel profile, in particular a steel profile produced according to an aforementioned method. The invention also relates to a sheet pile, in particular a Z sheet pile. The invention further relates to a system for producing a steel profile from a workpiece, in particular a steel blank, preferably a steel strip blank.

Methods for producing a steel profile, steel profiles, sheet piles and systems for producing a steel profile are basically known from the prior art. In steel mills, steel profiles are often produced by continuous casting, by hot rolling or by cold rolling. Steel profiles made by mass forming of steel blanks are also known. When building sheet pile walls, steel profiles in the form of sheet piles are often used as components of the sheet pile walls. Z-shaped sheet piles and U-shaped sheet piles, in particular, are known in this context, and are connected to each other by various forms of interlock, e.g. by means of "Larssen interlocks". The sheet piles are generally connected to each other by inserting the interlocks into each other when inserting, ramming or vibrating the sheet piles into the ground.

SUMMARY

The object of the present invention is to provide an improved method for producing steel profiles, an improved steel profile, an improved sheet pile and an improved system for producing a steel profile from a workpiece.

This object is achieved, according to the invention, by a method for producing steel profiles, the method comprising the steps of: providing a workpiece, in particular a steel blank, preferably a steel strip blank, forming a weakened point in the region of a planned bend in the workpiece and bending the workpiece to produce a bend in the workpiece.

The invention is based on the realisation that prior art methods have several disadvantages. Prior art methods are energy-intensive, labour-intensive and involve high setup and/or start-up costs. This results in large minimum order volumes and comparatively long delivery periods, so it is essential that production is planned long in advance and that large amounts of stock be kept in order to respond in a flexible manner to customer orders.

The advantages of the method according to the invention are that steel profiles can be produced autonomously, flexibly and fully automatically, preferably directly from a coil and/or a roll of steel strip, or with flat rolled steel workpieces as starting material. Production costs are also kept low due to comparatively low tooling costs, low labour costs and little loss of material. The well-timed production, well-adapted to demand, that is achieved by applying the method also allows storage costs to be kept low. The method is also energy efficient, clean and ecofriendly in operation. Energy is saved, in particular, when processing thick-walled steel.

The weakened point in the workpiece preferably runs along a planned bend in the workpiece.

According to one advantageous embodiment of the method according to the invention, the weakened point is formed by forming an indentation, in particular a notch, in the workpiece. This is a particularly expedient and simple variant for forming a weakened point in the region of a planned bend in the workpiece.

In the context of the present invention, the expression "notch" is to be understood as an indentation which is formed in the workpiece in such a way that it has an open end.

In another embodiment of the method according to the invention, the weakened point, in particular an indentation forming the weakened point, is formed by milling, rolling, punching or stamping. Weakened points can thus be formed in the workpiece in a particularly simple manner and, if necessary, automatically.

A particularly preferred embodiment of the method according to the invention is one in which the weakened point is reinforced after bending by welding, in particular by laser welding, and preferably by a laser hybrid welding technique. Due to such reinforcement of a weakened point provided for bending purposes, a steel profile with particularly high stiffness is produced after bending.

The welding preferably serves to close completely an indentation that is partly closed as a result of bending. For example, ends of the indentation in the workpiece which contact each other can be joined together undetachably by welding.

In the context of the present invention, the expression "laser welding" shall be understood to mean the undetachable joining of two ends of a steel profile using an optically focused, high-intensity laser beam.

According to one embodiment of the method according to the invention, welding is done using a focused laser beam which is aimed from the outer side of the bend in the workpiece to the inner side of the bend, in particular along a zero gap formed by the indentation after bending, the focus of said beam preferably being inside the workpiece. The expression "zero gap" shall be understood within the context of the present invention to mean that the sides of the indentation lie against each other after bending, for example have contact, without forming a chemical combination.

It is basically possible, by bending the workpiece just once, to weld from the outer side of the bend in the workpiece to the inner side of the bend, or also to weld from the inner side of the bend to the outer side of the bend, regardless of the bend angle. When producing a steel profile, however, some bends cannot be welded by starting from the inner side of the bend, as some inner sides of the bend and/or zero gaps are concealed by adjacent strips in the workpiece and are therefore inaccessible for a laser beam. Welding can also be carried out in a particularly simple manner by means of a laser beam which is directed from the outer side of the bend to the inner side of the bend. A single focused laser beam is preferably used thereby, rather than an oscillating beam or two partial laser beams.

According to another embodiment of the inventive method, an indentation forming the weakened point and which is formed on an inner side of the bend is reduced in size or closed during bending, or an indentation forming the weakened point and which is formed on an outer side of the bend in the workpiece is enlarged during bending. This is a particularly expedient embodiment of the method, in which an indentation constituting the weakened point is formed in a particularly suitable way for bending purposes. The method is also simplified in this manner, since an indentation in the material can be formed prior to bending in such a way that the indentation can be adapted accordingly to the bending to be carried out. It is preferred that the indention can be matched to an intended bend angle.

According to another expedient embodiment of the inventive method, an indentation forming the weakened point is provided in the workpiece, wherein the indentation formed on an inner side of the bend in the workpiece is closed after bending by welding, in particular by laser welding. A method is thus defined with which an indentation which is initially reduced in size on bending is closed by welding to reinforce the steel profile.

In another embodiment of the method according to the invention, sides which define an indentation forming the weakened point are undetachably joined together. In this way, a weakened point provided for bending purposes is additionally reinforced after bending.

According to another expedient embodiment of the method according to the invention, bending is done by free bending, folding or die bending. In this way, the workpiece can be bent in a particularly simple and automated manner to form a steel profile.

According to yet another preferred embodiment of the inventive method, the workpiece is provided by unrolling a steel strip roll, in particular a coil. In the context of the present invention, the expression "coil" shall be understood to mean a wound metal strip, for example in the form of a steel strip coil.

According to another preferred embodiment of the method according to the invention, an indentation is introduced into a workpiece in the form of a steel strip blank, prior to bending, said indentation being oriented transverse to the longitudinal direction of the steel strip blank and open to a lateral edge of the steel strip blank. The indentation may be provided, for example, in the form of a slot-like indentation which is laterally introduced into the steel strip blank by means of a stamping tool, a high-energy laser beam or a steel saw, for example. The longitudinal direction of the steel strip blank is preferably the direction in which the steel strip blank moves during the production process, for example on a production line. This can also be the direction, more specifically, in which a steel strip unwound from a steel strip coil is fed to the production line.

The indentation allows steps in the production process to be carried out in a first region of the steel strip blank without this affecting a second region of the steel strip blank that is separated from the first region by the indentation.

According to a preferred development of the aforementioned embodiment, the indentation projects into the steel strip blank in such a way that a bending moment in a first region of the steel strip blank which limits a first portion of the indentation, is not transmitted to a second region of the steel strip blank which limits a second portion of the indentation. This substantially simplifies the production process for a steel profile when steel strip blanks are used. The bending according to the inventive method can be carried out without any necessity arising to separate individual sections of the steel strip blank completely from each other prior to bending. The indentations are each introduced with a predefined depth into the steel strip blank in such a way that a bending moment in a first region of the steel strip blank is not transmitted to a second region of the steel strip blank, the two regions nevertheless remaining joined together in a predefined portion of the steel strip blank.

In the production process according to the invention, for producing a steel profile, the first region of the steel strip blank is located in a bending device, for example, such that the workpiece can be bent therein. The indentation serves in this case to prevent the bend being applied to a second region of the steel strip blank that is still located in the weakening device, for example.

The object specified at the outset is also achieved, according to the invention, by a steel profile, in particular a steel profile produced by an aforementioned method, in the form of a workpiece which has a weakened point in a bending region.

The present invention is based on the realisation that prior art steel profiles have a number of disadvantages. Until now, prior art steel profiles could only be bent by applying a very large amount of energy. Depending on the bending technique deployed, material accumulations and distortions ensue, for example on the inner side of the bend in the workpiece, that have to be removed during finishing.

One advantage of the steel profile according to the invention is that a bending technique for forming a steel profile can be carried out in a particularly simple and energy efficient manner. Material costs are also kept low.

According to one advantageous embodiment of the inventive steel profile, the weakened point is formed as an indentation in the workpiece. The weakened point is thus provided in a particularly simple and expedient form.

In one particularly preferred embodiment of the steel profile according to the invention, the workpiece has a substantially V-shaped indentation in the bending region, the sides of the indentation preferably forming an angle ranging from 90° to 135°.

According to yet another preferred embodiment of the inventive steel profile, the workpiece has a substantially W-shaped indentation in the bending region. A W-shaped indentation in this sense can also be formed by two V-shaped indentations provided adjacent to each other. After bending, the sides of the W-shaped indentation, i.e. the respective sides of the two V-shaped indentations, lie against each other and form a zero gap. This zero gap can then be closed by welding, in particular by laser welding.

One key advantage of a W-shaped indentation is that, when bending the workpiece, only a particularly small region is deformed, i.e. is cold formed. In the case of a W-shaped indentation which is open towards the inner side of the bend, only the region of the workpiece which faces away from the inner side of the bend is deformed during bending. As a result, the strength of the workpiece material is only slightly affected by bending. This is particularly important when using steel profiles, as the deformed region is harder, but also more brittle.

According to another preferred embodiment of the inventive steel profile, the workpiece has an indentation which is V-shaped in a first region and W-shaped in a second region, in particular in a bottom region of the indentation, the sides of the V-shaped region preferably forming an angle ranging from 50° to 110°. After the workpiece has been bent, the sides of the W-shaped region of the indentation lie against each other and form a zero gap. The sides of the V-shaped region of the indentation also lie against each other after bending and form a zero gap. Three zero gaps are thus formed: one zero gap in the V-shaped region and two zero gaps in the W-shaped region, i.e. between the sides of the two V-shaped indentations forming the W-shaped region. These zero gaps are then preferably closed by welding, in particular by laser welding.

One key advantage of an indentation of this kind is that, when bending the workpiece, only a very small region is deformed. With an indentation of this kind that is open to the inner side of the bend, said region is one that faces away from the inner side of the bend, for example. As a result, the strength of the workpiece material is only slightly affected by bending. Furthermore, it is possible with indentations of this kind to produce large bend angles while simultaneously exerting a minimal effect on the material. In addition, good bending characteristics are obtained regardless of the direction in which the workpiece is rolled, i.e. the direction in which the roller turns during production of the blank. After bending the workpiece provided with an indentation of this kind, the workpiece has a greater thickness at the apex of the bend than in the unbent region of the workpiece. If, for example, the workpiece is bent by an angle of 110°, the apex has a thickness that is approximately 1.7 times the thickness of the workpiece in the unbent region.

According to another preferred development of the two aforementioned embodiments, the sides of the W-shaped indentation adjoin the sides of the V-shaped indentation, in particular in such a way that the respective outer sides of the W-shaped indentation adjoin the sides of the V-shaped indentation. This can be understood in such a way that specifically the free ends of the outer sides of the W-shaped indentation adjoin the sides of the V-shaped indentation. The sides of the V-shaped indentation do not adjoin each other, but extend respectively from the ends of the W-shaped indentation to the inner side of the bend in the workpiece, i.e. to the open side of the indentation, for example. In this way, it is possible, in particular, to produce an indentation that is open to the inner side of the bend.

The angle between the sides of the V-shaped indentation is preferably equal to the bend angle of the workpiece. It is also preferred that the respective outer sides of the W-shaped indentation are oriented substantially parallel to each other. It is further preferred that the width of the W-shaped indentation increases with an increasing angle between the sides of the V-shaped indentation.

In another expedient design of the steel profile according to the invention, the workpiece has a weld seam, in particular a laser weld seam, for reinforcing the weakened point in the bending region. This results in a steel profile that is particularly stable and simple to produce.

The object specified at the outset is also achieved according to the invention by a sheet pile, in particular a Z sheet pile formed by a steel profile which is produced by a method of the kind described above. A sheet pile produced by the inventive method has a greater thickness, in particular at the apexes of the bends, than at the unbent regions of the sheet pile. According to DIN 10248, sheet piles generally have a thickness in the order of about 12 mm in the unbent regions of the sheet.

The object specified at the outset is also achieved according to the invention by a sheet pile, in particular a Z sheet pile, comprising: a lock member for connecting the sheet pile to a lock member of another sheet pile or of a support element, comprising a neck strip extending substantially at right angles from a wall section of the sheet pile and comprising a claw strip extending from the neck strip, wherein the claw strip is oriented substantially at an angle of at least 90°, in particular at an angle of 100° to 130°, to the neck strip, and one end of the claw strip faces the wall section. A neck strip extending substantially at right angles from an wall section of the sheet pile should preferably be understood in the context of the present invention to mean that the neck strip is oriented at an angle of approximately 90° to the wall section.

The lock member of the sheet pile is preferably produced according to the invention by a method of the kind described in the foregoing. This is preferably done by bending a steel strip blank by the method described above into the shape of the lock member. The lock member is specifically used to engage with a lock member of another sheet pile. This is preferably done by inserting the lock member into a lock member of another sheet pile when it is being rammed or vibrated into the ground.

According to a preferred embodiment of the sheet pile according to the invention, the neck strip is oriented at an angle of at most 90°, in particular at an angle of approximately 20° to 60°, preferably 35° to 45°, to the wall section.

The object specified at the outset is also achieved according to the invention by a sheet pile, in particular a Z sheet pile, comprising: a lock member for connecting the sheet pile to a lock member of another sheet pile or of a support element, comprising a neck strip extending substantially at right angles from a wall section of the sheet pile, a head strip extending from the neck strip, in particular substantially at right angles thereto, a front strip extending from the head strip, in particular substantially at right angles thereto and a claw strip extending from the front strip, wherein the claw strip is oriented substantially at an angle of at least 90°, in particular at an angle of 100° to 130°, to the front strip and extends from the front strip in a U-shaped region formed by the neck strip, the head strip and the front strip. A neck strip extending substantially at right angles from an wall section of the sheet pile should preferably be understood in the context of the present invention to mean that the neck strip is oriented at an angle of approximately 90° to the wall section. A head strip extending substantially at right angles from the neck strip should preferably be understood in the context of the present invention to mean that the head strip is oriented at an angle of approximately 90° to the neck strip. A front strip extending substantially at right angles from a head strip should preferably be understood in the context of the present invention to mean that the front strip is oriented at an angle of approximately 90° to the head strip.

The lock member of the sheet pile is preferably produced according to the invention by a method of the kind described in the foregoing. This is preferably done by bending a steel strip blank by the method described above into the shape of the lock member. The lock member is specifically used to engage with a lock member of another sheet pile. This is preferably done by inserting the lock member into a lock member of another sheet pile when it is being rammed or vibrated into the ground.

The lock member (referred to in this paragraph as the second lock member) of the sheet pile is used, in particular, for engagement with a lock member of the kind described above, comprising a neck strip and a claw strip (referred to in this paragraph as the first lock member). When the two lock members are engaged with each other, the two front strips lie against each other and are oriented substantially parallel to each other. The claw strips of the two lock members also lie against each other, that is to say, the claw strip of the first lock member extends parallel to the claw strip of the second lock member. The neck strip of the first lock member extends from the wall section of the sheet pile in the U-shaped region of the second lock member formed by the neck strip, the head strip and the front strip of the first lock member. The claw strip projects into a region of the first lock member formed by the neck strip and the claw strip of the first lock member. The two wall sections of the sheet piles which are joined together by means of the lock members are aligned substantially parallel to each other and lie in the same plane. When two lock members of the kind described in the foregoing are joined together, interspace are formed that are very small in volume compared to those in lock member connections in the prior art. As a result, the amount of sealant needed to fill the interspaces after the lock members have been inserted into each other is less. It is further preferred that the first lock member is formed at a first end of the sheet pile, with another lock member, preferably a lock member corresponding to the second lock member, being formed at a second end of the sheet pile. Numerical analyses based on the finite element method, and tests with lock members have shown that the inventive connection between two lock members as described in the foregoing is particularly resilient against tensile forces. This is particularly the case with a first lock member in which the neck strip is oriented at right angles to the wall section and the claw strip extends at an angle of 120° to 140° to the neck strip. This is also the case with a second lock member, in which the neck strip is oriented substantially at right angles to the wall section, the head strip is oriented substantially at right angles to the neck strip, the front strip is oriented substantially at right angles to the head strip and the claw strip extends from the neck strip at an angle of 120° to 140° to the front strip. If, when lock members of this kind are joined together, a tensile force is exerted in the direction of extension of the wall sections of the lock members (the material thickness of the sheet pile being approximately 10 mm), the lock members do not fail until a tensile force of 136 kN is exerted (kN: kilonewtons). In comparison thereto, joins between Larssen profiles such as those known from the prior art fail when a tensile force of 80 kN is exerted. The aforesaid tensile forces were determined with samples that were each 100 mm in length.

According to one preferred development of the sheet pile according to the invention, the neck strip is oriented at an angle of at most 90°, in particular at an angle of approximately 30° to 70°, preferably 45° to 55°, to the wall section, the head strip being oriented at an angle of at most 90°, in particular at an angle of approximately 20° to 50°, preferably 30° to 40°, to the neck strip and/or the front strip being oriented at an angle of at most 90°, in particular at an angle of approximately 30° to 70°, preferably 45° to 60°, to the head strip.

According to one preferred development of the sheet pile according to the invention, the claw strip is oriented substantially at an angle of 120° to 140° to the front strip.

The numerical analyses and tests with lock members, described above, have shown that the development described above is particularly resilient against tensile forces when two lock members are joined together. If a tensile force is exerted in the direction of extension of the wall sections of the lock members (the material thickness of sheet pile being approximately 10 mm), the lock members do not fail until a tensile force of 112 kN is exerted. When a tensile force of 110 kN is exerted, for example, the wall sections of the joined lock members are pulled apart by between 50 and 60 mm, compared to the original position when no force is exerted. In comparison thereto, the wall sections of the joined lock members as described above are pulled apart by 90 to 100 mm, compared to the original position when no force is exerted, In other words, the offset between the wall sections when a tensile force is exerted is less in comparison to the join between two lock members as described above. Another advantage is that when a force in the order of about 80 kN is exerted, less stress and strain ensues in than in the case of the lock members described above. This is particularly advantageous for the welded points.

According to one advantageous embodiment of the inventive sheet pile, one end of the claw strip is rounded. This means, for example, that the end of the claw strip has no sharp edges, from the perspective of the sheet pile cross-section. The end of the claw strip is preferably rounded by milling. When joining the sheet piles by inserting the lock members into each other, any sharp edges would result in material being cut away from the interlocks. The cuttings that ensue accumulate between the lock members are cause them to become wedged, in part. Inserting the lock members into each other is severely affected, or is rendered impossible when a particular amount of cuttings has accumulated between the lock members. The interlocks are also damaged by the sharp edges cutting away material, and their stability is simultaneously impaired. Rounding the ends of the claw strips prevents such cutting away of material, which means that the lock members of two sheet piles can be inserted into each other in a particularly simple manner, without damage being caused to the interlocks.

The object specified at the outset is also achieved, according to the invention, by a sheet pile wall comprising at least two sheet piles, in particular Z-sheet piles of the kind described above.

The object specified at the outset is also achieved, according to the invention, by a system for producing a steel profile from a workpiece, in particular from a steel blank, preferably a steel strip blank, said system comprising a weakening device for forming a weakened point in the workpiece, in particular an indentation, in the region of a planned bend in the workpiece, and a bending device for bending the workpiece in the region of the weakened point.

The present invention is based on the realisation that prior art systems for producing steel profiles are particularly complex, cause high levels of power consumption as well as high setup and start-up costs.

One advantage of the system according to the invention is that steel profiles can be produced with the system in a particularly simple and automated manner.

The weakening device may preferably be provided in the form of a milling unit, a punching unit, a stamping unit and/or a rolling unit. Preferably, the bending device may also include a folding unit, a die bending unit and/or a bending unit for free bending of the workpiece.

According to one preferred variant of the inventive system, the system includes a feeding device for providing the workpiece, in particular the steel blank, preferably the steel strip blank. In this way, a workpiece for producing the steel profile can be fed automatically to the system.

The feeding device may preferably be provided as an automatic grappler that takes workpieces from a stack of workpieces. It is further preferred that the feeding device can be a unrolling unit for unrolling a steel strip coil.

According to another embodiment of a system according to the invention, a cutting device is provided for dividing a steel strip fed from a steel strip coil into workpieces. In this way, steel strip workpieces can be cut to the required size and/or length for producing a steel profile.

According to a further preferred embodiment of the system according to the invention, a cutting device is designed to introduce an indentation which is oriented substantially transverse to the longitudinal direction of the steel strip coil and which is open to a lateral edge of the steel strip coil.

BRIEF DESCRIPTION OF THE DRAWINGS

Preferred embodiments of the invention shall now be described with reference to the drawings, in which:

FIG. 8 shows a perspective view of one embodiment of a workpiece, FIG. 9 shows a perspective view of the steel strip coil shown in FIG. 8m in an intermediate state, FIG. 11 shows a perspective view of a second embodiment of a sheet pile wall according to the invention, FIG. 12 shows a cross-sectional view of a second embodiment of a sheet pile wall according to the invention and FIG. 13 shows a cross-section of a portion of a lock member.

DETAILED DESCRIPTION

Figure 1:
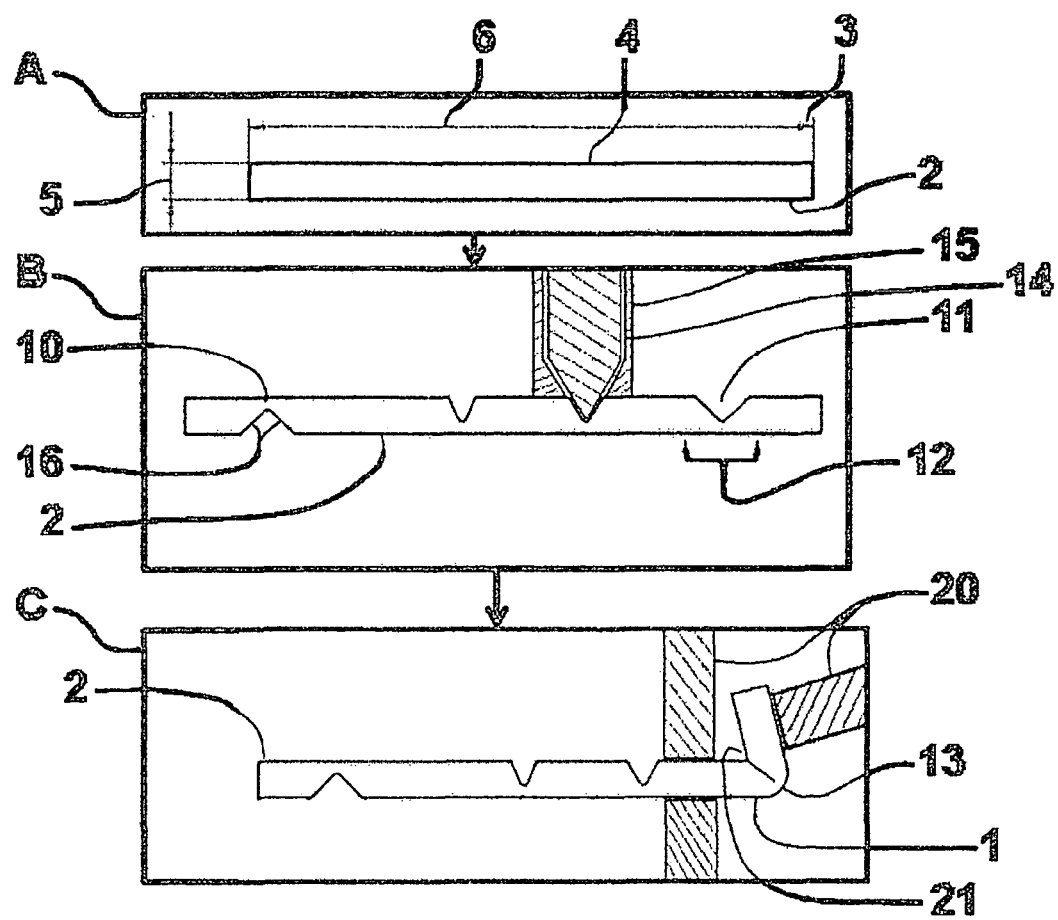
FIG. 1 shows an embodiment of a method according to the invention.

FIG. 1 shows an embodiment of a method according to the invention for producing a steel profile 1. A workpiece 2 is shown in each case in a view from the side, transverse to a longitudinal direction 3 of workpiece 2.

In step A, workpiece 2 is provided in the in the form of a rectangular steel strip blank 4, which has a height 5 and a length 6.

In step B, weakened points 10 in the form of indentations 11 are formed in a region 12 of a planned bend 13 in workpiece 2. A tool unit 15, used as a weakening device 14, removes a fragment from workpiece 2. V-shaped indentations 11 having two side 16 of substantially equal length are formed in the process.

In step C, workpiece 2 is bent in bending region 12 by means of a bending device 20 in such a way that an indentation 11 formed in step B on an inner side 21 of the bend in workpiece 2 is closed. In the bent state, the sides 16 of the indentation 11 formed in step B come into contact with each other.

In another step of the method (not shown), the sides 16 are joined together undetachably by laser welding in such a way that the weakened point originally provided as indentation 11 is reinforced to form a steel profile 1 with a high stiffness. The laser welding is carried out in such a way that the gap formed when sides 16 come into contact with each other is closed by a laser weld seam. Technically, the gap formed may also be a zero gap, in which case the sides do not need to be adapted for welding.

Figure 2:
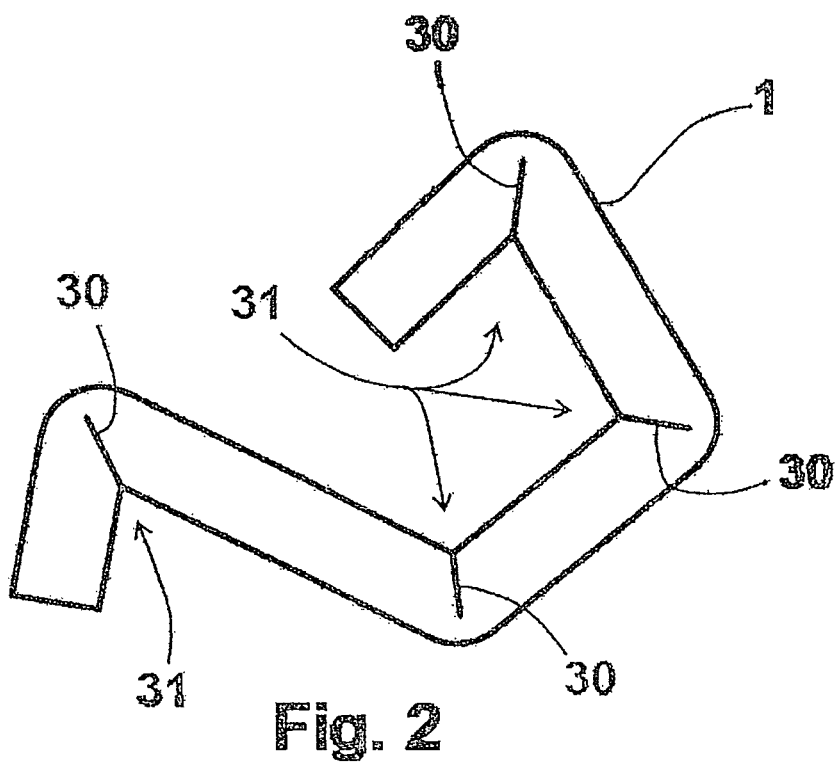
FIG. 2 shows an embodiment of a steel profile according to the invention.

FIG. 2 shows a side view of an embodiment of a steel profile 1 according to the invention, produced by a method according to the invention from the workpiece 2 shown in FIG. 1. Identical members, or members having identical functions, are marked therein with the same reference signs.

The indentations formed in the production process are closed by bending. The steel profile has weld seams 30 with which the indentations are securely closed in order to reinforce the steel. On the inner sides 31 of the bend or the outer side of the bend, the weld seams run in the viewing direction along steel profile 1 and extend partly into workpiece 2 along the sides 1 shown in FIG. 1.

Figure 3:
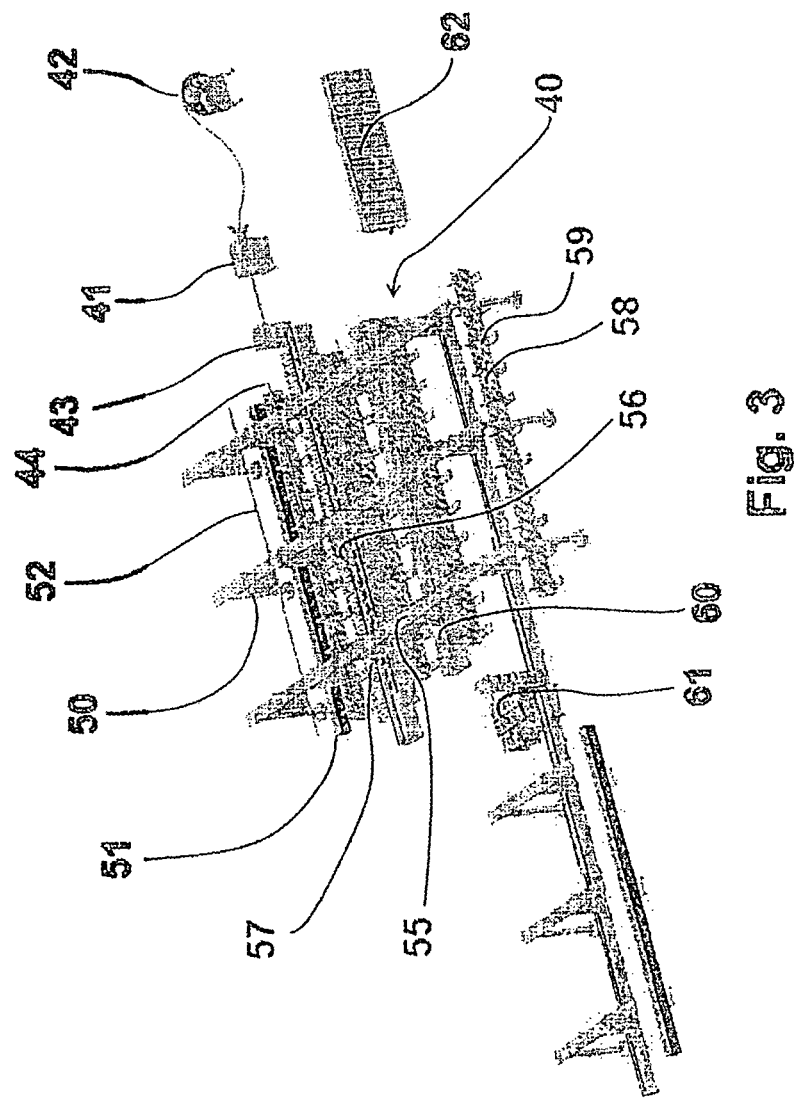
FIG. 3 shows a first embodiment of a system according to the invention.

FIG. 3 shows an embodiment of a system 40 according to the invention for producing a steel profile from a workpiece. A feeding device 41 removes steel strip from a steel strip coil 42 so that the steel strip can be divided in a cutting device 43 into workpieces 44 of a suitable size for the further production process. The system also has a second feeding device 50 which removes a workpiece 52 from a pallet 51 of workpieces for the further production process.

Transfer elements 55 guides workpieces 44, 52 to be processed to a weakening device 56, which is provided in the form of a milling unit 57.

After milling unit 57 has formed an indentation in the workpiece, workpiece 44, 52 is guided by transfer elements 55 to a bending device 60 for bending workpiece 44, 52.

After bending, workpieces 44, 52 are fed to a laser device 61, in which the indentations in the workpieces are closed. After welding, steel profiles 58 can be put to the side on a stack 59 by transfer elements 55.

The system 40 is controlled by a central controller 62.

Figure 4:
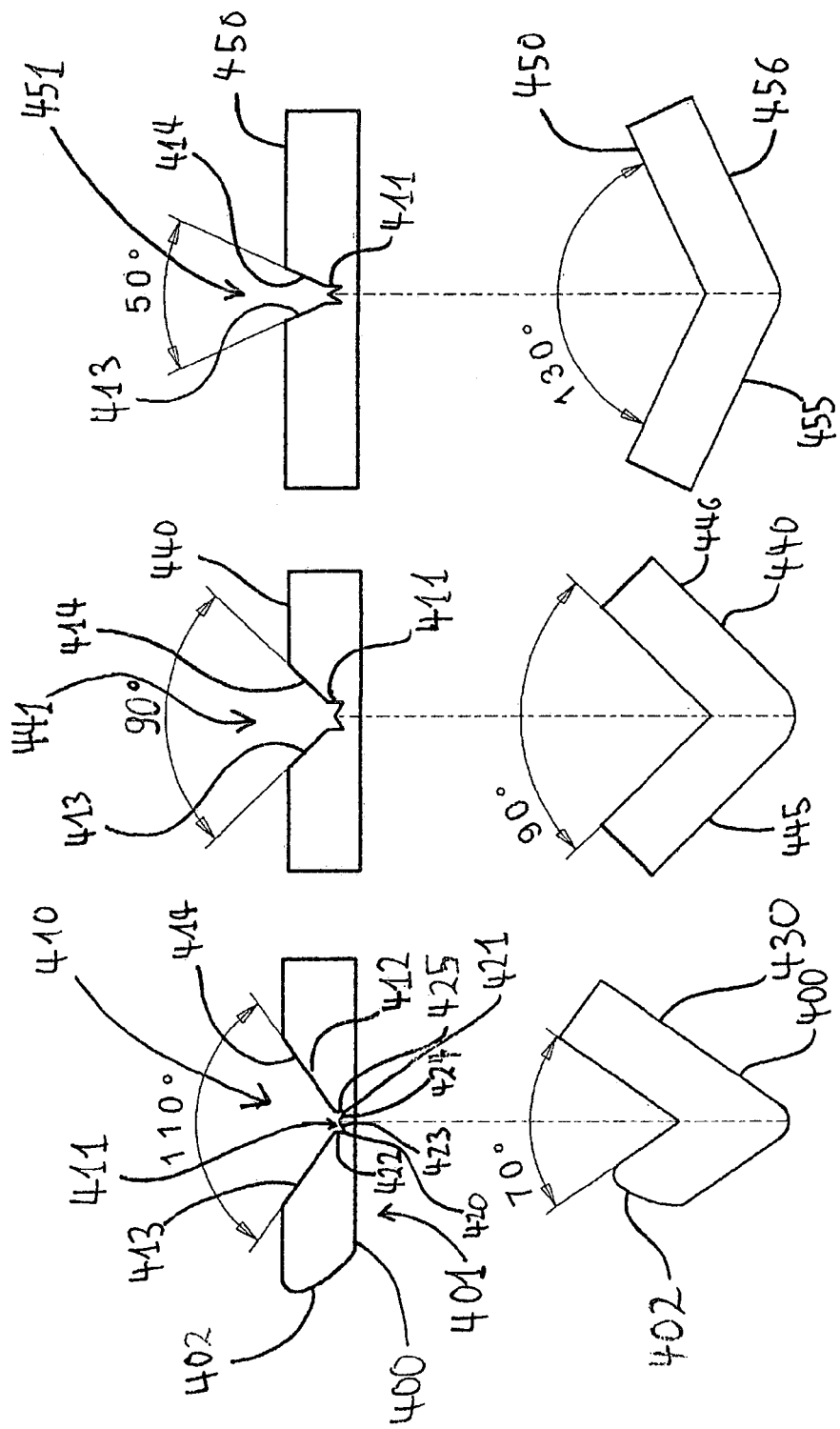
FIGS. 4A-C show further embodiments of a method according to the invention.

FIGS. 4A-B show a second embodiment of a method according to the invention. More specifically, FIGS. 4A-B each show two intermediate states of a workpiece 400 before bending (top) and after bending (bottom).

FIG. 4A shows an end portion 401 of a workpiece 400, in which end 402 is rounded, i.e. without sharp edges. In the intermediate state shown at the top in FIG. 4A, an indentation 410 in workpiece 400 has a W-shaped region 411 and a V-shaped region 412. W-shaped region 411 consists of a first V-shaped portion 420 and a second V-shaped portion 421. A first side 413 of V-shaped region 412, on the left when seen in the direction of viewing, adjoins a first side 422 of the first V-shaped portion 420 an. A second side 423 of V-shaped portion 420 adjoins a first side 424 of the second V-shaped portion 421. A second side 425 of the second V-shaped portion 421 adjoins a second side 414 of V-shaped portion 412. Proceeding from left to right when seen in the direction of viewing, indentation 410 is defined by the following adjoining elements: first side 413 of V-shaped region 412, first side 422 of first V-shaped portion 420, second side 423 of first V-shaped portion 420, first side 424 of second V-shaped portion 421, second side 425 of second V-shaped portion 421 and second side 414 of V-shaped region 412.

The opening angle between first side 413 and second side 414 is approximately 110°.

At the bottom, FIG. 4A shows workpiece 400 in an intermediate state after bending. During bending, the workpiece was bent to a bend angle of approximately 110°, thus resulting in an opening angle of approximately 70° between an end portion 401 and a right-hand portion 430 of workpiece 400, as seen in the direction of viewing. After bending, the sides of the respective V-shaped regions or portions lie against each other and/or form a zero gap, i.e. side 413 forms a zero gap with side 414, side 422 forms a zero gap with side 423 and side 424 forms a zero gap with side 425.

FIG. 4B shows a workpiece 440 having an indentation 441 which is formed substantially like indentation 410. Identical members, or members having identical functions, are marked therein with the same reference signs. In the indentation 441 shown in FIG. 4B, the opening angle between first side 413 and second side 414 is approximately 90°. During bending, sides 413 and 414 of the V-shaped region 412 and sides 422 and 423 and sides 424 and 425 of W-shaped region 411 form a respective zero gap, such that an angle of approximately 90° is produced between the sections 445 and 446 which are bent towards each other.

FIG. 4C shows a workpiece 450 having an indentation 451 which is formed substantially like indentations 410 (FIG. 4A) and 441 (FIG. 4B). Identical members, or members having identical functions, are marked therein with the same reference signs. In indentation 451 shown in FIG. 4C, the opening angle between first side 413 and second side 414 is approximately 50°. During bending, sides 413 and 414 of the V-shaped region 412 and sides 422 and 423 and sides 424 and 425 of W-shaped region 411 form a respective zero gap, such that an angle of approximately 130° is produced between the sections 455 and 456 which are bent towards each other.

Figure 5:
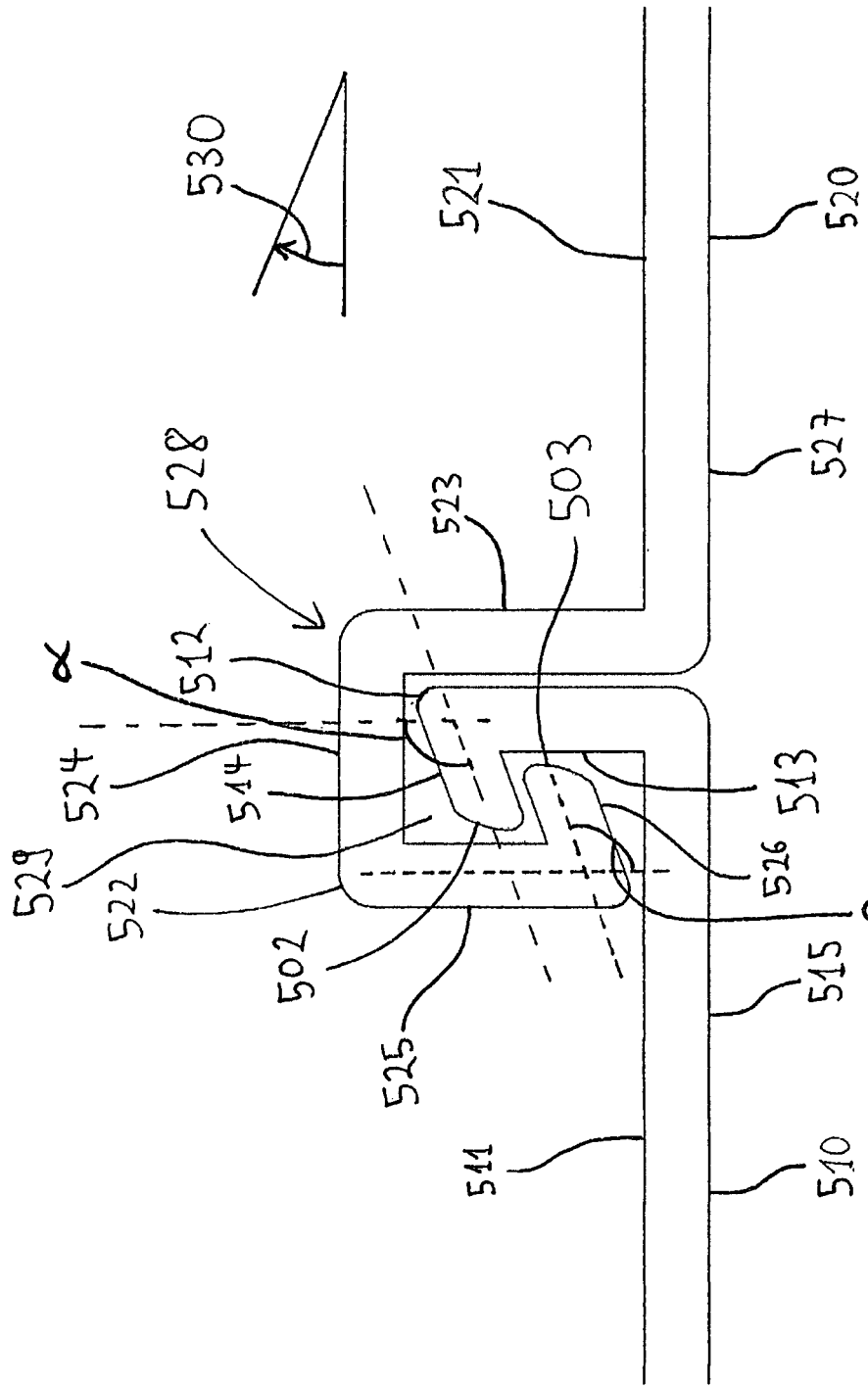
FIG. 5 shows two first embodiments of two sheet piles according to the invention.

FIG. 5 shows a respective section 510, 520 of a first sheet pile 511 and a second sheet pile 521. The first sheet pile 511 has a lock member 512 in engagement with a lock member 522 of the second sheet pile 521. In references to FIG. 5, stated angles with positive values greater than 0° are to be understood as angles measured in the clockwise direction 530; stated angles with negative values less than 0° are to be understood as angles measured in the anti-clockwise direction.

The lock member 512 of the first sheet pile 511 is formed by a neck strip 513 and a claw strip 514. Neck strip 513 extends from a wall section 515 of the first sheet pile 511 at a substantially right angle (approximately −90°). The bending of a workpiece necessary to achieve such angle can be carried out, for example, via the intermediate state of workpiece 440 shown in FIG. 4A. Claw strip 514 extends from neck strip 513 at an angle α of approximately −110°. The bending of a workpiece necessary to achieve such an angle, e.g. of approximately 110°, can be carried out, for example, via the intermediate state of workpiece 400 shown in FIG. 4A. The end of claw strip 514 simultaneously forms an end 502 of the first sheet pile 511. Said end 502 is rounded and has no sharp edges, at least from the perspective of the sheet pile cross-section. Lock member 522 of the second sheet pile 521 is formed by a neck strip 523, a head strip 524, a front strip 525 and a claw strip 526. Neck strip 523 extends from a wall section 527 of the second sheet pile 521 at a substantially right angle (approximately +90°). Head strip 524 extends from neck strip 523 at a substantially right angle (approximately −90°). Front strip 525 extends from head strip 524 at a substantially right angle (approximately −90°). The bending of a workpiece necessary to achieve such a right angle can be carried out, for example, via the intermediate state of workpiece 440 shown in FIG. 4B. Claw strip 526 extends from front strip 525 at an angle β of approximately −110° thereto. The bending of a workpiece necessary to achieve such an angle, e.g. of approximately 110°, can be carried out, for example, via the intermediate state of workpiece 400 shown in FIG. 4A. The end of claw strip 526 simultaneously forms an end 503 of the second sheet pile 521. Said end 503 is rounded and has no sharp edges, at least from the perspective of the sheet pile cross-section.

Neck strip 523, head strip 524 and front strip 525 form a U-shaped region 528 of sheet pile 521. In combination with wall section 527, U-shaped region 528 forms a sickle-shaped region of sheet pile 521. Claw strip 526 projects thereby into an inner space 529 formed by U-shaped region 528 and/or the sickle-shaped region. In the arrangement shown in FIG. 5, wall sections 515 and 527 are aligned parallel to each other and are arranged in the same plane.

If wall sections 515 and 527 are moved towards each other, lock members 512 and 522 abut each other with their front strips 513 and 523. In the event of tensile forces acting between the sheet piles 511 and 521, i.e. when the sheet piles are driven apart by strong forces in the direction of extension of the wall sections, the lock members engage each other in such a way that end 502 of claw strip 514 abuts front strip 525 and end 503 of claw strip 526 abuts neck strip 513. The interlocks remain locked when pressure is exerted, for example transversely to the longitudinal direction of extension of sheet piles 511 and 521. Only by displacing the interlocking sheet piles in the viewing direction of FIG. 5 can the sheet piles be separated from each other.

Figure 6:
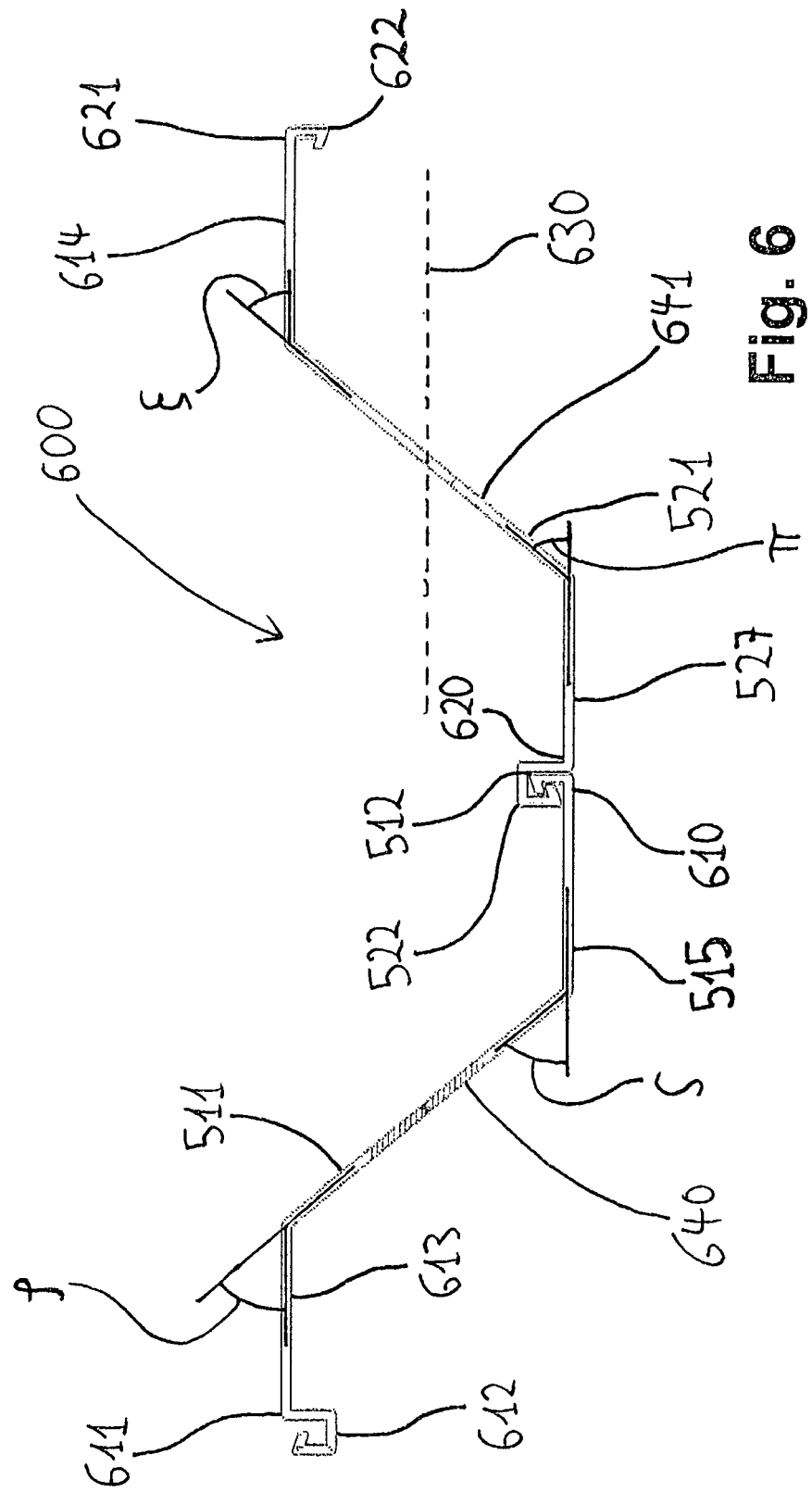
FIG. 6 shows a cross-sectional view of a first embodiment of a sheet pile wall according to the invention.

FIG. 6 shows a section of a sheet pile wall 600 comprising two sheet piles. The sheet piles shown in FIG. 6 are similar to the sheet piles shown in FIG. 5. Identical members, or members having identical functions, are marked therein with the same reference signs. A first sheet pile 511 is produced with a substantially Z-shaped profile and includes a first wall section 515 which has a lock member 512 at one end 610 (right). A second sheet pile 521 is produced with a substantially Z-shaped profile and includes a first wall section 527 which has a lock member 522 at one end 620 (left).

From the first wall section 515 of first sheet pile 511, a second wall section 640 of first sheet pile 511 extends at an angle ç of approximately +50° to first wall section 515. From the second wall section 640, a third wall section 613 of first sheet pile 511 extends at an angle ρ of approximately −50° to the second wall section 640. At one end 611, third wall section 613 has a lock member 612 which has substantially the same structure as lock member 522 of second sheet pile 521, that is to say, lock member 612 has the same shape as lock member 522 when mirrored in a plane 630.

From the first wall section 527 of second sheet pile 521, a second wall section 641 of second sheet pile 521 extends at an angle π of approximately −50° to first wall section 527. From the second wall section 641, a third wall section 614 of second sheet pile 527 extends at an angle ξ of approximately +50° to second wall section 641. At one end 621, third wall section 614 has a lock member 622 which has substantially the same structure as lock member 512 of the first pile sheet, that is to day, lock member 622 has the same shape as lock member 512 when mirrored in a plane 630.

Figure 7:
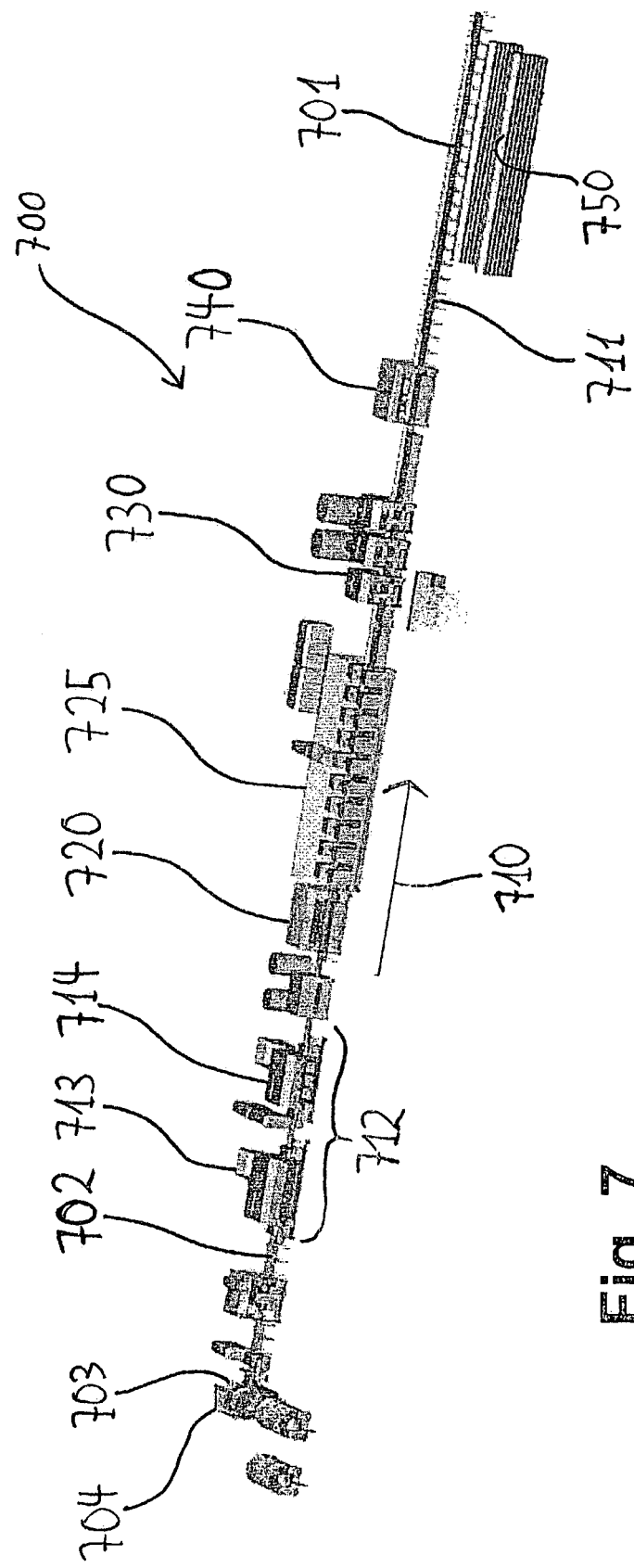
FIG. 7 shows a second embodiment of a system according to the invention.

FIG. 7 shows a second embodiment of a system 700 according to the invention for producing a sheet pile 701 from a steel strip blank 702. Steel strip blank 702 is unrolled from a steel strip coil 703 by means of a feeding device 704 and fed in feeding direction 710 to the following components of system 700 in conveying direction 710. A conveying device 711 is used to convey steel blank 702 in feeding direction 710 along and/or through the individual components of system 700.

Steel strip blank 702 proceeds from feeding device 704 to a milling device 712, by means of which indentations provided as weakened points are introduced into steel strip blank 702. Milling device 712 has two milling units 713 and 714. By means of milling unit 713, indentations are firstly introduced from below into steel strip blank 702. By means of milling unit 714, indentations are then introduced from above into steel strip blank 702.

A laser cutting device 720 is used to introduce slot-shaped cut-outs into steel strip blank 702. The cut-outs each run transversely to feeding direction 710 from an outer edge of steel strip blank 702 in a substantially straight line into steel strip blank 702. More specifically, two cuts are made at predefined distances in feeding direction 710, namely inwardly by a predefined depth from the lateral edge of steel strip blank 702. The cuts are made, in particular, in order to perform the bends to be made in the following production process, without the bending moments being transmitted to the entire steel strip blank 702 located on conveying device 710. The cuts are introduced at those points in steel strip blank 702 where the workpieces are subsequently severed from steel strip blank 702 in the subsequent production process.

A bending device 725 of system 700 is adapted to bend steel strip blank 702 at different points. In the region of the bends, the zero gaps formed during bending are closed by means of a laser device 730. After welding, the individual workpieces are severed from steel blank 702 by means of a cutting device 740. The finished workpieces can then be stored on a stack 750, for example for transport.

FIG. 8 shows a perspective view of a portion of a workpiece 800 according to the invention, embodied in the form of steel strip blank 801. Indentations 810 are introduced into steel strip blank 801, which extend transversely to the longitudinal direction of extension 815 of steel strip blank 801 and laterally into steel strip blank 801 and which are open to a lateral edge 816 of the steel strip blank. A first region 820 defines a first portion 821 of indentation 810. A second region 830 defines a second portion 831 of indentation 810. A bending moment 840 can be exerted thereby on second region 830 of steel strip blank 801, in the form of a torque about axis 841 represented by a broken line. I.e. the region of the steel strip blank shown under broken line 841, when seen in the viewing direction, remains in its position, whereas the edge of steel strip blank 801 shown above broken line 841, seen in the viewing direction, is exposed to a torque about axis 841. Due to indentation 810, a bending moment 841 of this kind is not transmitted to first region 820 of steel strip blank 801. I.e. a bend can be performed in second region 830, without this bending being transmitted to first region 820 and/or having any effect on first region 820.

FIG. 9 shows a perspective view of the steel strip blank 801 shown in FIG. 8, in an intermediate state after bending. I.e. the steel strip blank 801 shown in FIG. 8 was subjected to bending operations that are performed during the production process on steel strip blank 801 in order to produce a sheet pile. FIG. 9 basically shows two sheet piles 901 and 902 that are separated from each other in a subsequent step in the production process.

Figure 10:
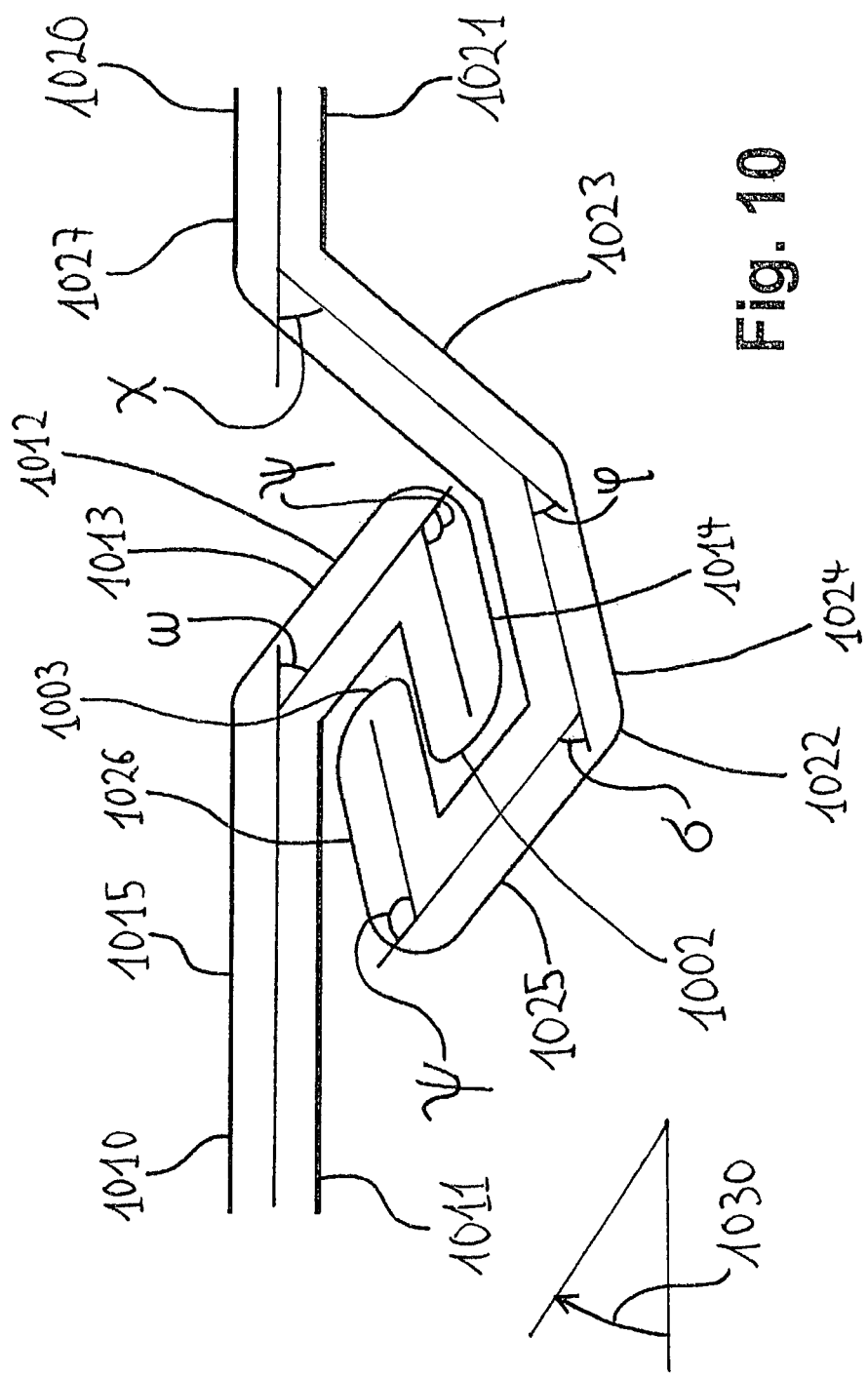
FIG. 10 shows two second embodiments of two sheet piles according to the invention.

FIG. 10 shows a respective section 1010, 1020 of a first sheet pile 1011 and a second sheet pile 1021. The first sheet pile 1011 has a lock member 1012 in engagement with a lock member 1022 of the second sheet pile 1021. In references to FIG. 10, stated angles with positive values greater than 0° are to be understood as angles measured in the clockwise direction 1030; stated angles with negative values less than 0° are to be understood as angles measured in the anti-clockwise direction.

Lock member 1012 of the first sheet pile 1011 is formed by a neck strip 1013 and a claw strip 1014. Neck strip 1013 extends from a wall section 1015 of the first sheet pile 1011 at an angle ω of +38°. Claw strip 1014 extends from neck strip 1013 at an angle ψ of approximately +123°. The end of claw strip 1014 simultaneously forms an end 1002 of the first sheet pile 1011. Said end 1002 is rounded and has no sharp edges, at least from the perspective of the sheet pile cross-section.

Lock member 1022 of second sheet pile 1021 is formed by a neck strip 1023, a head strip 1024, a front strip 1025 and a claw strip 1026. Neck strip 1023 extends from a wall section 1027 of second sheet pile 1021 at an angle χ of approximately −49.5°. Head strip 1024 extends from neck strip 1023 at an angle φ of approximately +30.5°. Front strip 1025 extends from head strip 1024 at an angle σ of approximately +57°. Claw strip 1026 extends from front strip 1025 at an angle ψ of approximately +123°. The end of claw strip 1026 simultaneously forms an end 1003 of the second sheet pile 1021. Said end 1003 is rounded and has no sharp edges, at least from the perspective of the sheet pile cross-section. In the arrangement shown in FIG. 10, wall sections 1015 and 1027 are aligned parallel to each other and are arranged in the same plane.

In the event of tensile forces acting between the sheet piles 1011 and 1021, i.e. when the sheet piles are driven apart by strong forces, the lock members engage each other in such a way that end 1002 of claw strip 1014 abuts front strip 1025 and claw strip 1026, and end 1003 of claw strip 1026 abuts neck strip 1013 and claw strip 1014. The interlocks remain locked when pressure is exerted, for example transversely to the longitudinal direction of extension of sheet piles 1022 and 1021. Only by displacing the interlocking sheet piles in the viewing direction of FIG. 10 can the sheet piles be separated from each other.

FIGS. 11 and 12 each show a section of a sheet pile wall 1100 comprising two sheet piles. FIG. 11 shows a perspective view, and FIG. 12 shows a cross-section of sheet pile wall 1100. The sheet piles shown in FIGS. 11 and 12 are similar in structure to the sheet piles shown in FIG. 10. Identical members, or members having identical functions, are marked therein with the same reference signs. A first sheet pile 1011 is produced with a substantially Z-shaped profile and includes a first wall section 1015 which has a lock member 1012 at one end 1110 (right). A second sheet pile 1021 is produced with a substantially Z-shaped profile and includes a first wall section 1027 which has a lock member 1022 at one end 1120 (left).

From the first wall section 1015 of first sheet pile 1011, a second wall section 1140 of first sheet pile 1011 extends at an angle v of approximately −50° to first wall section 1015. From the second wall section 1140, a third wall section 1113 of first sheet pile 1011 extends at an angle μ of approximately +50° to second wall section 1140. At one end 1111, third wall section 1113 has a lock member 1112 which has substantially the same structure as lock member 1022 of second sheet pile 1021, that is to say, lock member 1112 has the same shape as lock member 1022 when mirrored in a plane 1130.

From the first wall section 1027 of second sheet pile 1021, a second wall section 1141 of second sheet pile 1021 extends at an angle λ of approximately +50° to first wall section 1027. From the second wall section 1141, a third wall section 1114 of second sheet pile 1027 extends at an angle κ of approximately −50° to second wall section 1141. At one end 1121, the third wall section 1114 has a lock member 1122 which has substantially the same structure as lock member 1012 of the first sheet pile, that is to say, lock member 1122 has the same shape as lock member 1012 when mirrored in a plane 1130.

Figure 13:
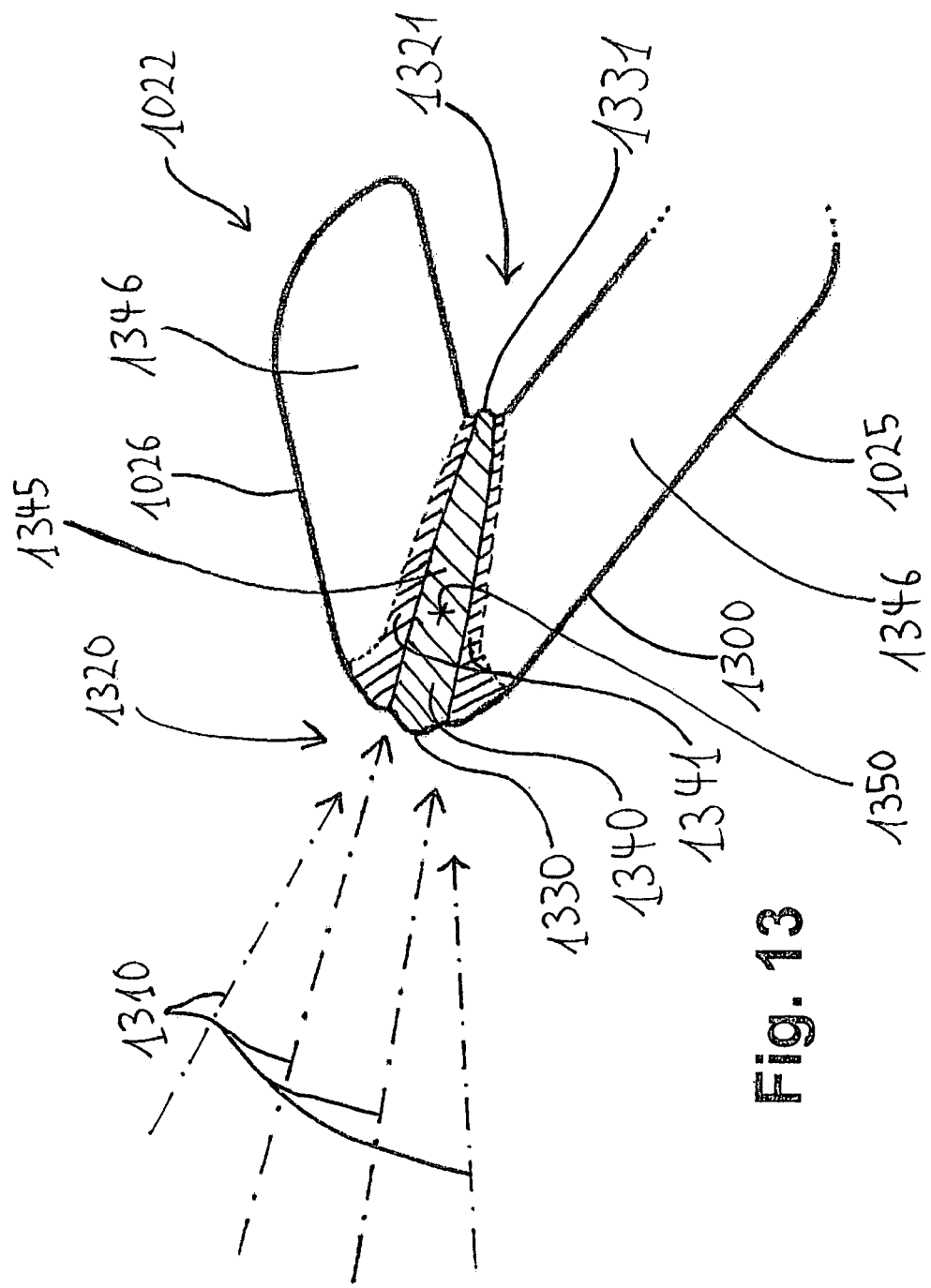

FIG. 13 shows a cross-section of a portion of the lock member 1022 shown in FIG. 10. This cross-section illustrates the welding operation that is carried out after the bending step. More particularly, FIG. 13 shows a claw strip 1026 and a portion of a front strip 1025. After bending, a zero gap is formed by the sides of the indentation, for example by sides 413 and 414 as depicted in FIG. 4A. To close (weld) the zero gap, a laser beam 1310 is directed from the outer side 1320 of the bend to the inner side 1321 of the bend. Laser beam 1310 runs substantially along the zero gap inside workpiece 1300. After welding, a weld root 1330 is formed on the bend outer side 1320 of the weld seam, and a weld root 1331 is formed on the bend inner side 1321 of the weld seam. Inside workpiece 1300, two regions 1340 and 1341 are formed after welding. Region 1340 is formed by a substantially triangular weld core 1345 which is fully fused during welding. Region 1341 is formed by a transitional region between weld core 1345 and region 1346 of the workpiece, which is not involved in the welding operation. Welding from bend outer side 1320 ensures that a wedge-shaped weld root is formed, the tip of which is oriented towards bend inner side 1321. The focus 1350 of laser beam 1310 is inside workpiece 1300, in particular in region 1340. This focal position, i.e. the position of the focus inside the workpiece (proceeding from the point at which the laser beam hits the workpiece), ensures a broad root, with the result that a wide area of the bend outer side is affected. In the case of W-shaped indentations, in particular, which project out in dovetail fashion in the bent state, it is thus possible to fuse the zero gaps formed during bending. The region deformed during bending is also fused, with the result that the joint is under less strain after cooling than in the pre-bent state.

Laser beam 1310, which is used for welding, preferably has a power rating of 10 kW to 14 kW (kilowatts). For a bend angle of approximately 110°, the power rating of the laser welding beam is preferably about 14 kW, with a preferred focal position of approximately −14 mm; for a bend angle of approximately 90°, the nominal power of the laser welding beam is preferably about 12 kW, with a preferred focal position of approximately −16 mm, and for a bend angle of approximately 50° the nominal power of the laser welding beam is preferably about 10 kW, with a preferred focal position of approximately −8 mm. The laser welding beam preferably moves during welding along the workpiece to be welded, in the viewing direction of FIG. 13, with a speed of 1.5 to 1.8 m/min (meters per minute).

The invention claimed is:

1. A method for producing a steel profile, the method comprising steps of:
   providing a steel blank workpiece;
   forming a weakened point by forming an indentation in a region of a planned bend in the workpiece; and
   bending the workpiece to produce a bend in the workpiece,
      wherein the indentation formed on an inner side of the bend in the workpiece is closed after bending by laser welding,
      wherein the laser welding uses a focused laser beam aimed from an outer side of the bend in the workpiece to the inner side of the bend, the focus of the beam being inside the workpiece.

2. The method according to claim 1,
wherein the indentation is formed by forming a notch, in the workpiece.

3. The method according to claim 1,
wherein the indentation is formed by milling, rolling, punching or stamping.

4. The method according to claim 1,
further comprising, after the step of bending, reinforcing the weakened point by a laser hybrid welding technique.

5. The method according to claim 1,
wherein during the step of bending, the indentation forming the weakened point and which is formed on an outer side of the bend in the workpiece is enlarged during bending.

6. The method according to claim 1,
wherein sides which define the indentation forming the weakened point are undetachably joined together.

7. The method according to claim 1,
wherein bending is done by free bending, folding or die bending.

8. The method according to claim 1,
wherein the step of providing a steel blank workpiece includes unrolling a steel strip coil.

9. The method according to claim 1,
wherein the step of forming an indentation includes forming the indentation substantially transverse to a longitudinal direction of the steel blank and being open at a lateral edge of the steel blank.

10. The method according to claim 9,
wherein the indentation projects into the steel blank in such a way that a bending moment in a first region of the steel blank which limits a first portion of the indentation is not transmitted to a second region of the steel blank which limits a second portion of the indentation.

* * * * *